US012579067B1

(12) United States Patent

Francois et al.

(10) Patent No.: US 12,579,067 B1

(45) Date of Patent: Mar. 17, 2026

(54) VECTOR IN RESTRICTED MEMORY TO TRACK REMOTE COPIES

(71) Applicant: International Business Machines Corporation, Armonk, NY (US)

(72) Inventors: Avery Francois, East Schodack, NY (US); Jie Zheng, Poughkeepsie, NY (US); Robert J Sonnelitter, III, Bedford Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/945,939

(22) Filed: Nov. 13, 2024

(51) Int. Cl.
    *G06F 12/08* (2016.01)
    *G06F 12/0815* (2016.01)

(52) U.S. Cl.
    CPC ................................ *G06F 12/0815* (2013.01)

(58) Field of Classification Search
    CPC .......................... G06F 12/0815; G06F 12/0835
    USPC .................................................. 711/141, 146
    See application file for complete search history.

(56) References Cited

U.S. PATENT DOCUMENTS

| | | | |
|---|---|---|---|
| 11,658,865 B2 | 5/2023 | Zimny et al. | |
| 11,947,418 B2 | 4/2024 | Bamdhamravuri et al. | |
| 2004/0230750 A1* | 11/2004 | Blake ................. | G06F 12/0822 |
| | | | 711/146 |
| 2017/0315916 A1* | 11/2017 | Cheng ................. | G06F 12/0831 |

| | | | |
|---|---|---|---|
| 2018/0143905 A1* | 5/2018 | Roberts ............... | G06F 12/0815 |
| 2019/0012265 A1* | 1/2019 | Safranek ............. | G06F 12/0811 |
| 2021/0133119 A1* | 5/2021 | Bono .................. | G06F 12/1009 |
| 2023/0418707 A1 | 12/2023 | Bamdhamravuri et al. | |

OTHER PUBLICATIONS

Authors et al.: Disclosed Without Attribution, "Auditing/Controlling Access to Resources over Screen Share", an IP.com Prior Art Database Technical Disclosure, IP.com No. IPCOM000269738D, IP.com Electronic Publication Date: May 10, 2022, 4 pages.
Authors et al.: Disclosed Without Attribution, "Dynamic adaptation of network resources from within edit context", an IP.com Prior Art Database Technical Disclosure, IP.com No. IPCOM000254210D, IP.com Electronic Publication Date: Jun. 12, 2018, 8 pages.
Babbar, P., "Remote Access To E-Resources Anywhere Anytime", published Nov. 2019, downloaded from https://library.iitd.ac.in/arpit_2020-2021/Week%206%20-%20Module%2015%20-%20PPT-%20Remote%20Access%20to%20E-Resources%20Anywhere,%20Anytime.pdf on Aug. 7, 2024, 57 pages.
Vector Networks Inc., "Flashing Ecus From a Distance With Vflash Remote", Press Release, Mar. 26, 2019, 2 pages.

(Continued)

*Primary Examiner* — Than Nguyen

(74) *Attorney, Agent, or Firm* — Caleb D. Wilkes

(57) ABSTRACT

A first processor chip includes one or more processor cores, one or more cache memories, and a restricted-access memory storing a remote access vector configured to track copies of data portions that are stored in a main memory. The remote access vector includes multiple bits. Each bit of the multiple bits corresponds respectively to one of different remote processing nodes that are able to request and receive one or more of the copies of the data portions and are external to the first processor chip. The bits are respectively set when a respective copy of a particular data portion is transmitted to the corresponding remote processing node.

20 Claims, 6 Drawing Sheets

(56) References Cited

OTHER PUBLICATIONS

Vector Networks Inc., "Remote Control And Remote Access", published online Mar. 2011 or earlier, downloaded on Aug. 7, 2024 from https://www.vector-networks.com/resources/brochures/Remote_Control_SS_A4.pdf, 2 pages.

* cited by examiner

VECTOR IN RESTRICTED MEMORY TO TRACK REMOTE COPIES

STATEMENT REGARDING PRIOR DISCLOSURE BY THE INVENTORS

The following disclosures are submitted under 35 U.S.C. 102(b)(1)(A):

DISCLOSURE: ["REMOTE ACCESS VECTOR", Ram Sai Manoj Bamdhamravuri; Robert J. Sonnelitter, III; Ulrich Mayer; Chad G. Wilson; Avery Francois; U.S Patent Application Publication No. 2023/0418707 A1, published 28 Dec. 2023.]

DISCLOSURE: ["REMOTE ACCESS VECTOR", Ram Sai Manoj Bamdhamravuri; Robert J. Sonnelitter, III; Ulrich Mayer; Chad G. Wilson; Avery Francois; U.S. Pat. No. 11,947,418 B2, published 2 Apr. 2024.]

BACKGROUND

The present invention relates generally to computer hardware and processors, e.g., to computer systems with a non-uniform memory access (NUMA) architecture with processors, memory, and input/output buses and with aggregate memory sharing across nodes.

SUMMARY

A first processor chip includes one or more processor cores, one or more cache memories, and a restricted-access memory storing a remote access vector configured to track copies of data portions that are stored in a main memory. The remote access vector includes multiple bits. Each bit of the multiple bits corresponds respectively to one of different remote processing nodes that are able to request and receive one or more of the copies of the data portions and that are external to the first processor chip. The bits are respectively set when a respective copy of a particular data portion is transmitted to the corresponding remote processing node.

According to one exemplary embodiment, a computer-implemented method includes setting a value in a first remote access vector in response to a copy of a data portion being requested from a first main memory and sent to an external processing node. The first remote access vector is stored in a first restricted-access memory of a first processor chip of a first drawer. The first remote access vector includes multiple bits. A number of the multiple bits is determined based on a number of external processing nodes that can receive a respective copy of the data portion.

According to another exemplary embodiment, a processor chip includes one or more processor cores, one or more cache memories, and a restricted-access memory region. A remote access vector is stored in the restricted-access memory region and is configured to track copies created and sent to an external node while data portions from which the copies were made are stored in a main memory for which the processor chip provides exclusive connective access. The remote access vector includes multiple n-tuple vectors wherein n is greater than one, and n corresponds to a number of different remote nodes that are able to request and receive the copies. A respective one of values of one of the n-tuple vectors is changed in response to a respective copy being sent to the remote node that corresponds to that one of the values.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
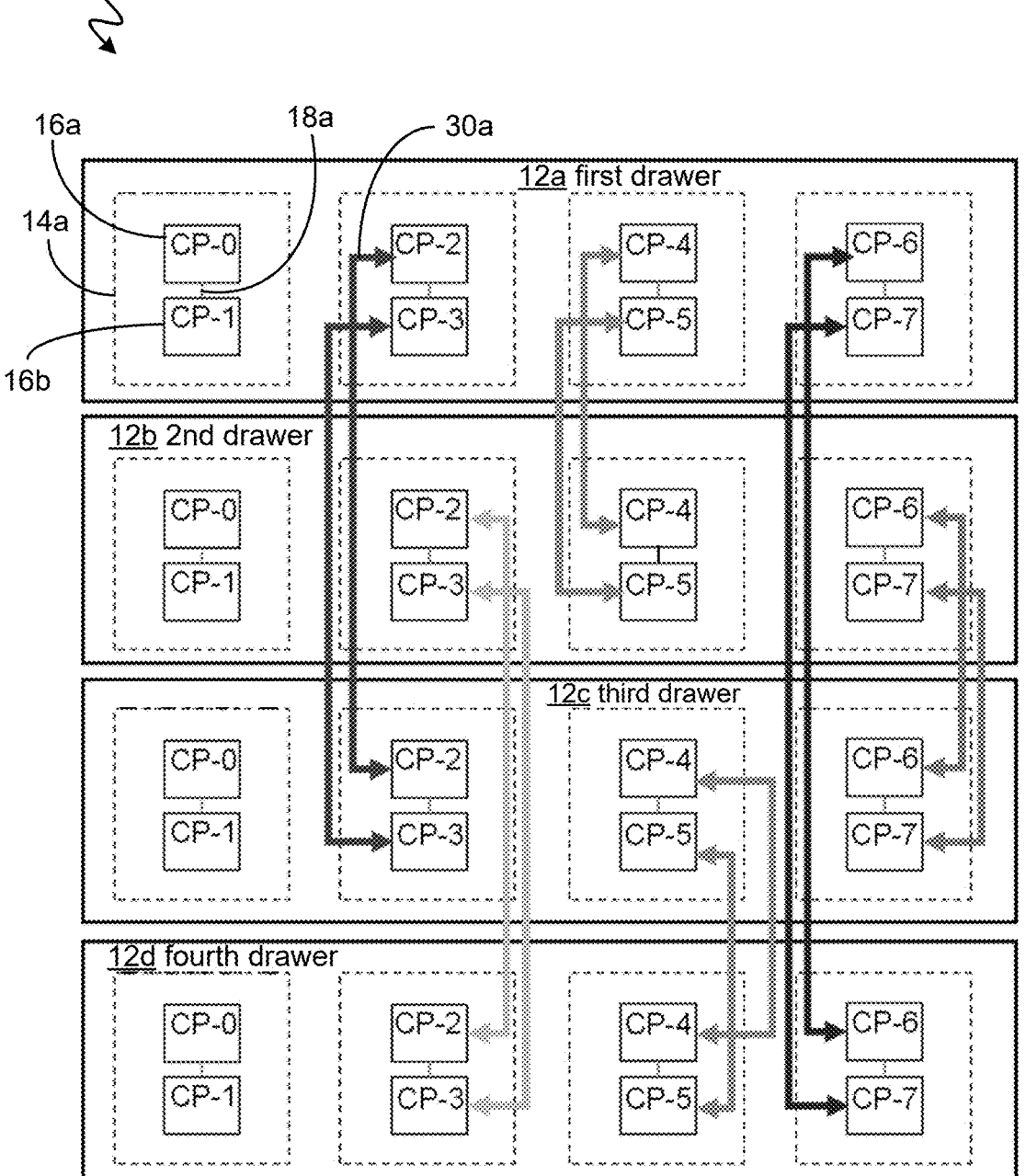
FIG. 1 shows a block diagram illustrating a multi-drawer architecture in which a remote access vector to track locations of remote copies may be implemented in accordance with at least one embodiment.

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide computer systems and methods for operating a remote access vector in order to reduce the frequency of system snoops and their resulting negative impact on system performance. In a multi-processor with multiple levels of caches and memory placed in a clustered NUMA structure, processor fetch requests have traditionally snooped each cache in the hierarchy before seeking a desired data portion from the main memory. When lateral NUMA domains and caches have directory content which is not shared, a computer system may perform snoops to investigate and evaluate data that is stored in other nodes of the system. On a fetch miss, one or more lateral caches may be snooped to determine if the desired data resides in any of the domains of the lateral caches. Each such snoop consumes cross-domain bandwidth and extends a controller busy time for signals in the system. Accessing the main memory directly might require less time than is needed to complete the lateral snoops, but the system may wait to receive the response from the lateral snoops. Such factors can hinder and slow the progress of a fetch request, increase a time duration of a fetch request, and negatively impact overall system performance.

Therefore, it may be advantageous to, among other things, provide a way to reduce the frequency of such lateral snoops and to better manage a system which manages such lateral snoops. The following described embodiments provide computer systems and methods which improve computer processing hardware by implementing one or more remote access vectors which reduce the latency of local node misses for data portions that are moved across nodes, reduce the number of requests that are sent on node-to-node links and thereby conserve bandwidth on those links, save power by avoiding certain cache vector lookups on non-home nodes, and conserve physical space on a node by reducing the number of state machines required to process off-drawer requests. The present embodiments help avoid some performance penalties and help improve processing speed. Thus, a computer system with the improved hardware features described herein may execute faster and improve system performance by using data portions sourced from memory or accessed via better focused snoops instead of snooping all the lateral nodes. The present embodiments reduce data sourcing time, reduce cross-link bandwidth, and minimize the resource busy time for the local node fetch misses.

The remote access vectors may include a snoop filter directory per memory port that tracks the lines pulled from the home memory node to a non-home memory node. Whenever a line of data is accessed by a remote processor, a bit for that line in the remote access vector is set. The remote access vector includes multiple bits corresponding to multiple remote processing nodes. By utilizing multiple bits in the remote access vector and providing a bit per remote processing node, remote drawer snooping resources are better focused to produce coherency searches. A snoop is sent to the remote processing node that has received a copy of the line of data instead of having to send a snoop to every remote processing node. The remote access vector with multiple bits tracks which remote node, e.g., remote drawer, has accessed the line and causes resources for a remote coherency search to be generated only for the remote node, e.g., drawer, which has a copy of the relevant line of data. The use of the remote access vector described herein avoids redundant search on the remote nodes, e.g., drawers, which do not have a copy of the relevant line of data. For example, if the remote access vector includes three bits and just one of the three bits is set, the snoop is sent to the remote node corresponding to the set bit and not to the other two remote nodes corresponding to the two bits that are not set.

If one of the multiple remote access vector bits is set for a line, the non-home node may have the line in use remotely and local memory access must wait for a coherency response from the remote node. If none of the remote access vector bits is set for a line, then it is assumed that none of the non-home processing nodes has a copy of the line and local memory access can proceed immediately. On a miss on the local processor cache on the home node, the remote access vector state may be checked to see if the line on the remote node is a state that requires a snoop to be sent. The remote access vector content may be backed up in the main memory or distributed for storage with a portion in a restricted-access cache memory directly on the processor chip and a portion in the main memory.

In a distributed cache system, during searching for a highest point of coherency, if the search must leave a drawer to search a remote drawer, then in prior configurations the search occurred for all other remote drawers whether or not the other drawers had a copy of the relevant data. This prior configuration ended up utilizing more inter-drawer bus bandwidth, remote drawer resource/controller usage, and power consumption for drawers that may not contain the data for which a search is being performed.

With the remote access vector of the embodiments described herein, multiple bits are included in the vector instead of a single bit. The multiple bits help indicate a location of which remote drawer accessed the copy instead of using a single bit which indicated in a binary affirmative or negative manner that a remote copy was transmitted to any of the remote processing nodes. With the present remote access vector, one bit in the remote access vector for each remote drawer would be used to indicate which drawer has accessed this line. The remote access vector for a particular data portion is stored in the memory chip in response to an exclusive ownership for that particular data portion having been granted by the remote drawer or in response to a shared copy being given to a remote drawer. The remote access vector will be updated if a tracked data line is shared to any other drawer to indicate multiple copies among different drawers. If an operation starts from the memory drawer, and if the remote access vector indicates only one other drawer has access to the line of data and has an exclusive copy or a read-only copy of the data line, in response the memory drawer will only need to obtain resources needed to access the remote node (e.g., remote drawer) indicated by the remote access vector and can avoid going to a drawer that does not have any copy of the relevant data line. If there is address contention, the remote access vector over indicates to make sure all drawers are checked and reached to catch any line movement. If a remote drawer is taking the line away exclusively, the access would update the remote access vector to point to the new drawer.

Additionally, using the remote access vector will allow better selection of remote drawer resources. In some embodiments, a ticket manager (a designated processor chip of a multi-chip drawer that is designated to govern off-drawer coherency searches for some or all chips of the multi-chip drawer) is utilized to control what local controllers can broadcast off drawer to be able to access a limited number of remote drawer resources. The ticket manager grants access to other chips on a first come first served basis. In prior configurations, the ticket manager would produce a ticket which granted access for a local drawer operation to broadcast to all other remote drawers. Now with the presently described remote access vector, the ticket manager checks the remote access vector information (e.g., consults the remote access vector) and based on the information obtained from the remote access vector then grants tickets on a per drawer basis. Therefore, the present embodiments result in a more effective management of off-drawer resources that are generated for coherency searches, namely by performing such off-drawer searches only to those remote nodes and operations that are relevant to the current usage of copies of a line of data. Under scenarios where the remote access vector is being utilized to go to fewer and different drawers, this usage of the remote access vector effectively increases the number of remote drawer operations that can be in progress at the same time.

An external node or remote processing node may refer to another component with its own computing components, e.g., its own processor and/or own memory, and for which a data transmission penalty is incurred when a data transmission to the external node is carried out. For example, with respect to a first node, an external node to that first node is any node which has a significantly greater, e.g., at least ten times greater, data transmission burden as compared to another local data flow path available to the first node. This data transmission burden may refer to a latency (speed)

determination and/or to an amount of energy and/or power required to produce the data transmission. The data transmission may be to source data and/or for a query. The remote access vector described herein is implemented to avoid unnecessary transmissions down this penalty-inducing path to the external node.

Figure 2:
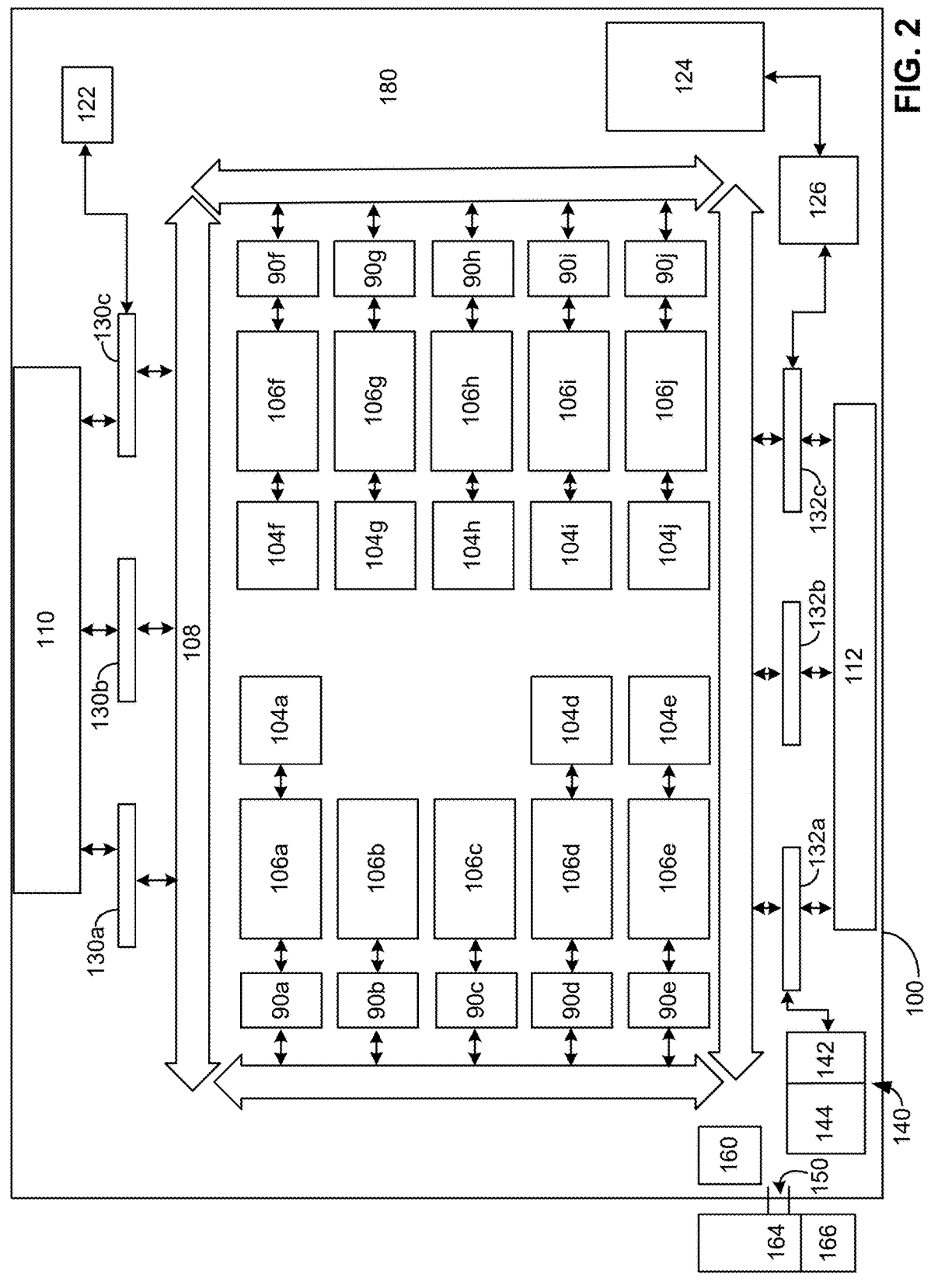
FIG. 2 depicts a processor chip architecture which implements a remote access vector with multiple bits to track locations of remote copies that were transmitted, and which may be included for one or more of the various processor chips shown in FIG. 1 according to at least one embodiment.
Figure 3:
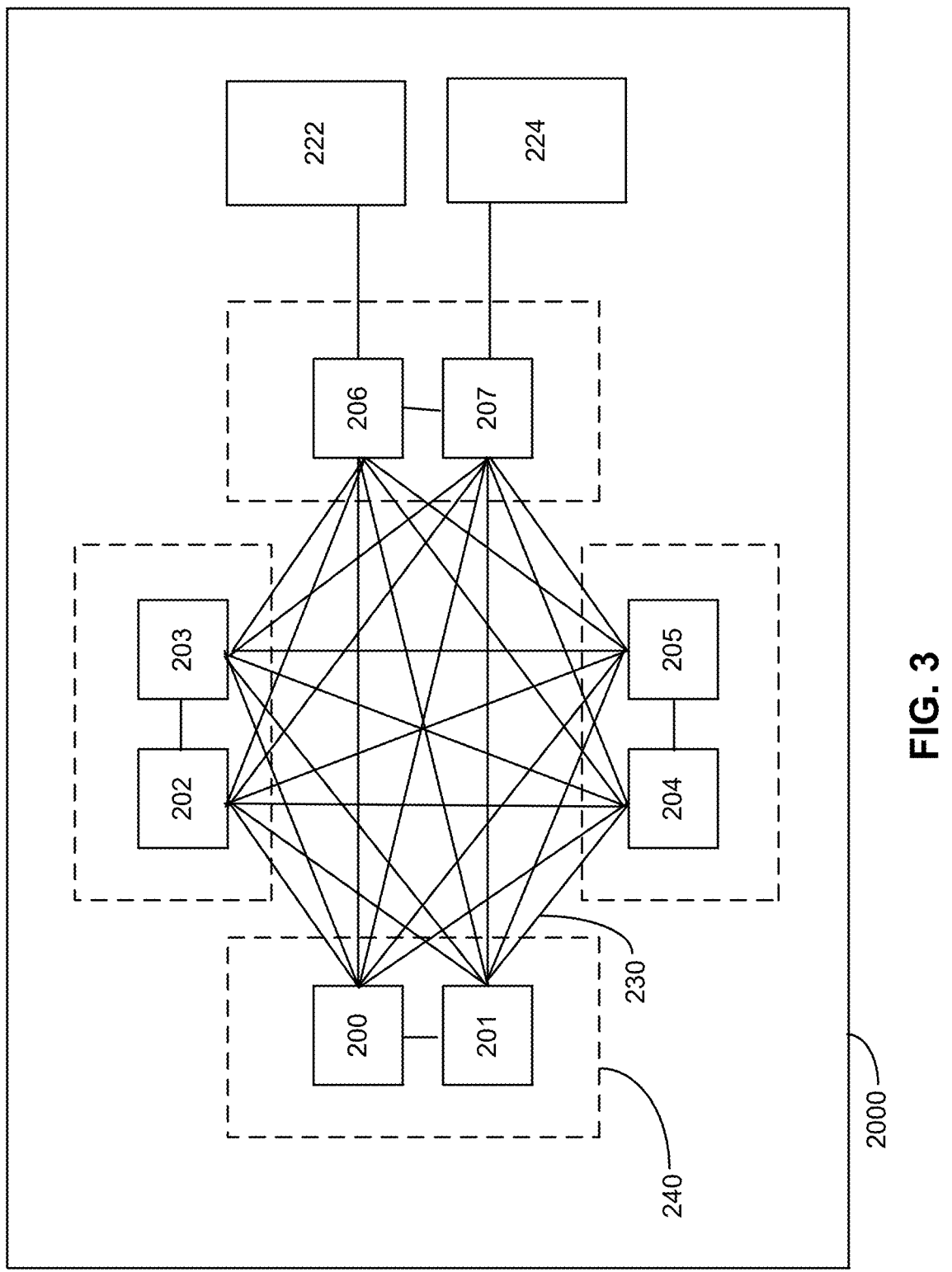
FIG. 3 depicts a drawer which includes interconnected multiple processor chips according to at least one embodiment wherein one or some of the processor chips have the processor chip architecture shown in FIG. 2.

Referring now to FIG. 1, a multi-drawer structure 10 in accordance with an embodiment of the present invention is shown. The multi-drawer structure 10 that is depicted includes four drawers, namely a first drawer 12a, a second drawer 12b, a third drawer 12c, and a fourth drawer 12d. Other embodiments of multi-drawer structures may include some other number of multiple drawers besides four. As depicted, each of the drawers may include multiple processor chips, such as eight processor chips, As depicted, the multiple processor chips are paired into groups of two in some embodiments. For example, the first drawer 12a includes a first processor chip 16a and a second processor chip 16b that are grouped together as a pair of chips in a first module 14a. Each of the first drawer 12a, the second drawer 12b, the third drawer 12c, and the fourth drawer 12d in some embodiments are designed and have components in conformity with one or more of the present embodiments. Details of the first processor chip 16a are shown in FIG. 2. All, some, or one of the other processor chips in the various drawers may include the design as depicted in FIG. 2. FIG. 1 shows that the four drawers each include four modules, namely four pairs of processor chips (including the first pair also referred to as the first module 14a). The first processor chip 16a may communicate with all the other processor chips within the first drawer 12a due to all of the other processor chips within the first drawer 12a being fully connected to each other (for example, as is shown in FIG. 3).

In at least some embodiments, an intra-module communication link 18a of the first processor chip 16a with the second processor chip 16b provides faster communication than other communication links provide for the first processor chip 16a to communicate with other processor chips outside of the first module 14a, e.g., with other chips in the first drawer 12a or with chips from other drawers.

Chips within a node, e.g., within a drawer, may communicate with each other in a manner that spends less energy and with a lower latency than occurs for chips communicating with chips outside of the node, e.g., with chips outside of the drawer. When chips within a node communicate with chips on other nodes, e.g., on other drawers, more energy and a greater latency are required than occur for chips communicating with chips inside of the node. When chips communicate with chips on other drawers, more energy and a greater latency are required than occur for chips communicating with chips outside of the module but within the same drawer. Thus, the first processor chip 16a may communicate with each of the other seven chips within the first drawer 12a more easily than the first processor chip 16a may communicate with any of the other processor chips in the second drawer 12b, in the third drawer 12c, and/or in the fourth drawer 12d.

The multi-drawer structure 10 depicted in FIG. 1 includes the communication aspect that one of the modules represents a communication portal with a specific other drawer. FIG. 1 shows a first inter-drawer bus 30a which connects the third processor chip (CP-2) in the first drawer 12a with another third processor chip in the third drawer 12c. The first inter-drawer bus 30a in some embodiments is referred to as a respective electronic pathway line that leads to a different remote processing node. A similar inter-drawer bus connects the fourth processor chip (CP-3) in the first drawer 12a with another fourth processor chip in the third drawer 12c. Anytime one of the eight processor chips in the first drawer 12a communicates with one or more of the eight chips in the third drawer 12c, the communication will be routed via one or both of the third processor chip (via the first inter-drawer bus 30a) and the fourth processor chip (via another inter-drawer bus). The drawers include protocols and mechanisms in programming logic to determine whether the first inter-drawer bus 30a or its companion inter-drawer bus (running from CP-3 to CP-3 on third drawer 12c) is selected for the transmission.

Similar exclusive communication connections occur for the chips of the first drawer 12a with the second drawer 12b via the third module of the first drawer 12a and with the fourth drawer 12d via the fourth module of the first drawer 12a. Other drawers, as illustrated in the depicted embodiment, have similar exclusive communication connections via particular modules. In some embodiments, the chips that act as the sole communication portal to another drawer are referred to as fork chips due to their skipping over some of the other drawers to make the communication connection.

Because communications and data transfer from drawer-to-drawer incur a large latency penalty, working partitions to support a client workload/project are often setup to be stored entirely within the private memory of a single drawer. In other instances, based on various factors, such a working partition is spread across multiple drawers. For example, a single working partition may use six of the processor chips on the first drawer 12a and four of the processor chips on the second drawer 12b. Thus, for execution of computing and processing the workload/project in this working partition spread across multiple drawers, inter-drawer transmission and data transfer must occur.

All chips within a particular drawer may share memory, but each or some of the processor chips within the first drawer 12a may have exclusive memory access to particular memory regions of the main memory. For example, in an embodiment the first processor chip 16a has direct access to main memory addresses for 0 to 250 MB, the second processor chip 16b has direct access to main memory addresses for 250 to 500 MB, etc. If any chip, for executing computing and processing, needs to access a memory address within the 0 to 250 MB main memory addresses, that chip must communicate through the first processor chip 16a in order to obtain the data stored in those addresses. Such access control applies also for chips from other drawers that are involved in a multi-drawer working partition. For example, if a processor chip from the second drawer 12b needs to access main memory addresses within the 0 to 250 MB region, that processor chip must send an intra-drawer notification from the second drawer to the first drawer (to reach an external drawer) and to, more particularly, reach the first processor chip 16a in order to access the data saved in that region of memory addresses.

In the multi-drawer structure 10 shown in FIG. 1, each of the chips in the first drawer 12a are point-to-point connected. In one embodiment, the memory for a first working partition is local to the first drawer 12a and is spread across each processor chip of the first drawer 12a. In some embodiments, the working partition size is based on the number of active processor cores needed and spreads across multiple drawers, e.g., may be spread across the first drawer 12a and the second drawer 12b. If the first processor chip 16a on the first drawer 12a needs data that is not present in any of its local private caches, the first processor chip 16a needs to check if there is a latest copy of that data portion in the cache of other processor chips within the first drawer 12a. If the latest copy is not available from one of the other caches, then this data portion must be sourced from the main memory. For the first processor chip 16a to retrieve data from any of the memory ports attached to the various processor chips in the first drawer 12a, a single hop is required excluding the local ring communication. For the first processor chip 16a to retrieve data, however, from any of the processor caches on an external node, e.g., on the second drawer 12b, a request must be sent to one of two processor chips within the first drawer 12a that connects to the second drawer 12b. In the depicted example, the fifth and sixth processor chips CP-4 and CP-5 of the first drawer 12a provide the only operative connections for the first drawer 12a to the second drawer 12b. From the chip CP-4 and/or from the chip CP-5 in the first drawer 12a, a request may be transmitted on behalf of the first processor chip 16a from the first drawer 12a and then upon reaching the second drawer 12b be broadcast to all of the chips of the second drawer 12b. Each of the chips of the second drawer 12b will check its respective private cache on the ring, e.g., on a ring equivalent to the ring interconnect 108 shown in FIG. 2 and described below. Each of the chips will then aggregate a response and send the response back to the first processor chip 16a on the first drawer 12a by using a similar flow path and the same number of hops that were needed for the first processor chip 16a to transmit the message to the chips of the second drawer 12b.

Thus, the data response from any memory port that is local to a node, e.g., a drawer, is faster than the data response from any remote node, e.g., from any remote drawer. Hence, it is advantageous to provide a remote access vector as described herein to track the lines that are being used by remote drawer and, more specifically, to track the location of which remote node has retrieved/received a copy of the relevant data so that better focused snooping is performed. This tracking helps to avoid the power and latency delay that are incurred on remote drawer snoops by reducing the number of remote drawer snoops that need to be performed.

Although FIG. 1 shows two processor chips per drawer as providing the sole communication paths to a respective other drawer, in other embodiments a single processor chip per drawer may provide a sole communication path to a respective other drawer. This construction of using a reduced number of chips as a pathway to an external node helps reduce a number of overall buses needed so that construction costs are reduced. This reduced number of chips may refer to some amount of chips less than the total amount in a group, whereby each of the reduced number has a pathway connection to an external node and provides the pathway for the other chips in the group which do not have their own pathway.

In the embodiment shown in FIG. 1, the first processor chip 16a is designated as the ticket manager for all of the processor chips of the first drawer 12a using first inter-drawer bus 30a to access the second drawer 12b, third drawer 12c or fourth drawer 12d. Thus, the first processor chip 16a grants access to other chips of the first drawer 12a for off-drawer requests that travel off of first drawer 12a to the second drawer 12b, to the third drawer 12c, or to the fourth drawer 12d using the first inter-drawer bus 30a and to processing chips on the second drawer 12b, third drawer 12c, or fourth drawer respectively. Another processing chip (e.g. CP-2, CP-4 or CP-6) of the first drawer can be designated as a second ticket manager to govern off drawer access using the inter-drawer bus 30a to the second drawer 12b, to the third drawer 12c and to the fourth drawer 12d. Another processing chip (e.g. CP-1, CP3, CP-5 or CP7) of the first drawer 12a can be designated as another ticket manager to govern off drawer access using the second inter-drawer bus to the second drawer 12b, to the third drawer 12c and to the fourth drawer 12d. Selection of ticket drawers can be established during initialization of operation of the multi-drawer architecture 10. For prior configurations with a remote access vector which included a single bit that indicated whether a copy of a particular data line had been achieved remotely, the ticket manager (first processor chip 16a) would produce a ticket which granted access for a local drawer operation to broadcast to all other remote drawers, e.g., to each of the second drawer 12b, the third drawer 12c, and the fourth drawer 12d. The ticket manager would have to wait for resources from all three of the fork chips (e.g., CP-2, CP-4, and CP-6) from the first drawer 12a to be available. All three of the fork chips would send a snoop via a bus line to their respective drawer for a remote drawer search.

An improvement is made, however, with the remote access vector having multiple bits as described herein. The remote access bits themselves indicate not only that a remote retrieval/usage of a copy is live, but also which remote node has the copy. Thus, the ticket manager (first processing chip 16a) checks the remote access vector information and based on the information obtained from the remote access vector then grants tickets on a per drawer basis. The remote access vector indicates in the present example that a node on the fourth drawer 12d is using a copy of a desired data portion. Thus, with this enhanced information the ticket manager only needs to wait for resources from the CP-6 chip in the first drawer 12a to be available so that a snoop is sent to the fourth drawer 12d to access the status of the retrieved copy. No snoop to the second drawer 12b or to the third drawer 12c is needed, which means that the remote access vector with multiple bits that help indicate location of a data copy retrieval helps reduce transmission costs which frees up processing power to achieve additional computing at a faster rate.

While the multi-drawer structure 10 shown in FIG. 1 is used to provide an illustration of a system in which the processor architecture of the present embodiments is implemented, it is understood that the depicted structure is not limiting and is intended to provide an example of a suitable structure in which the techniques of the present embodiments are applied. It should be appreciated that FIG. 1 does not imply any limitations with regard to the structures in which different embodiments may be implemented. Many modifications to the depicted structures may be made based on design and implementation requirements. For example, one of the other chips of the first drawer 12a could be designated as the ticket manager instead of the first processing chip 16a being designated as the ticket manager.

Table 1 below shows an example of a remote access vector with three bits representing three remote processing nodes that can receive copies of information from a first processing chip. Table 1 is associated with the multi-drawer structure 10 shown in FIG. 1 which includes four drawers. For a remote access vector of a processing chip of the first drawer 12a, each of the three bits is associated with a respective different one of the three additional drawers (namely second drawer 12b, third drawer 12c, and the fourth drawer 12d). For a remote access vector of a processing chip of the second drawer 12a, each of the three bits is associated with a respective different one of the three additional drawers (namely first drawer 12a, third drawer 12c, and the fourth drawer 12d). For a remote access vector of a processing chip of the third drawer 12c, each of the three bits is associated with a respective different one of the three additional drawers (namely first drawer 12a, second drawer 12b, and the fourth drawer 12d). For a remote access vector of a processing chip of the fourth drawer 12d, each of the three bits is associated with a respective different one of the three additional drawers (namely first drawer 12a, second drawer 12b, and third drawer 12c). Table 1 shows on the left most column a state of the remote access vector, the top row shows the indicator of which drawer has that particular remote access vector, and the table cells indicate the meaning for the respective bit state and drawer location.

TABLE 1

| | First drawer 12a | Second drawer 12b | Third drawer 12c | Fourth drawer 12d |
|---|---|---|---|---|
| 0b000 | No remote drawer | No remote drawer | No remote drawer | No remote drawer |
| 0b001 | Fourth Drawer 12d | Fourth Drawer 12d | Fourth Drawer 12d | Third Drawer 12c |
| 0b010 | Third Drawer 12c | Third Drawer 12c | Second Drawer 12b | Second Drawer 12b |
| 0b011 | Third and Fourth | Third and Fourth | Second and Fourth | Second and Third |
| 0b100 | Second Drawer 12b | First Drawer 12a | First Drawer 12a | First Drawer 12a |
| 0b101 | Second and Fourth | First and Fourth | First and Fourth | First and Third |
| 0b110 | Second and Third | First and Third | First and Second | First and Second |
| 0b111 | All remote drawers | All remote drawers | All remote drawers | All remote drawers |

Based on the information of the state of the bits, the ticket manager knows to which of the one or more external drawers a snoop should be sent to ascertain the state of the retrieved copy of the data portion. The snoop could be sent to none, one, two, or all three of the other drawers of the four-drawer computing structure shown in FIG. 1.

FIG. 2 is a processor chip architecture 100 which has an architecture that implements the remote access vector with multiple bits respectively corresponding to multiple external processing nodes according to at least one embodiment. All, some, or at least one of the various processor chips CP-0 to CP-7 on each of the four drawers shown in FIG. 1 has a processor chip architecture similar to or matching the processor chip 100 as shown in FIG. 2 and as described below. The processor chip 100 includes multiple separate processing cores 104a, 104b, 104c 104d, 104c, 104f, 104g, 104h, 104i, and 104j. The processing cores are connected to their own separate caches, e.g., their own L3 cache. Specifically, processing core 104a is connected to and paired with the cache 106a. Processing core 104d is connected to and paired with the cache 106d. processing core 104e is connected to and paired with the cache 106e. Processing core 104f is connected to and paired with the cache 106f. Processing core 104g is connected to and paired with the cache 106g. Processing core 104h is connected to and paired with the cache 106h. Processing core 104i is connected to and paired with the cache 106i. Processing core 104j is connected to and paired with the cache 106j. Processing cores 106b and 106c are also present. A cache is a hardware component on the processor chip that has data storage locations so that the stored data is more easily retrievable. The data stored in a cache is often data generated from an earlier computation or a copy of data that is stored in other memory. The various processor cores and other components are disposed on a substrate portion 180.

The processor chip 100 includes a ring interconnect 108 which connects and allows communication between the various caches, processing cores, and other components of the processor chip 100. The ring interconnect 108 also communicates with fabric 110 which facilitates communication with components that are external to the processor chip 100, such as another processor chip in the same drawer or another processor chip on another drawer of the same computing structure. The ring interconnect 108 includes ring stations 130a, 130b, 130c to facilitate communication with the internal caches 106a-106j and processing cores 104a-104j and the fabric 110 and an accelerator unit 122. The ring interconnect 108 includes ring stations 132a, 132b, 132c to facilitate communication with the memory bus 112, the microcontroller unit 124, and the multiple clock domain microprocessor 126.

The first ring station 132a of the ring interconnect 108 also facilitates communication with a first remote access vector 142 according to at least one embodiment. The first remote access vector includes in various embodiments multiple bits corresponding to multiple exterior processing nodes. Table 1 above shows various examples and combinations of what an example with three bits would mean depending on the location of the particular remote access vector. For a remote access vector in the first drawer 12a, the remote access vector for a particular data line for which no copy has been retrieved would appear "0b000". In response to a processor chip on one of the second, third, or fourth drawers 12b, 12c, 12d requesting and receiving a transmission of a copy of a relevant data portion, either the first bit, the second bit, or the third bit, respectively, would be changed from "0" to "1" in the remote access vector.

Each of the individual processor cores may communicate with other caches within the second processor chip 16b of the same shared first module 14a via the ring interconnect 108, the fabric 110, and a first intra-module bus 18a (shown in FIG. 1). Each of the individual processor cores may communicate with other caches within the other six processor chips of the first drawer 12a, namely with the processor chips of other modules of the first drawer 12a, via the ring interconnect 108, the fabric 110, and various electrical connecting lines shown in FIG. 3.

FIG. 2 shows that the ten processor cores of the first processor chip 16a have access to a first main memory 164 and are operatively connected, e.g., directly operatively connected, to the first main memory 164. In at least some embodiments, the first main memory 164 includes a random-access memory such as a DDR4 SDRAM (double data rate 4 synchronous dynamic random-access memory) or includes a DIMM (dual in-line memory module). Other types of memory structures are suitable for other embodiments. Other processor chips of the first drawer 12a and those included within any working partition that encompasses the first drawer 12a and extends to other drawers may share this first main memory 164 with the first processor chip 16a. The other chips, however, must access the first main memory 164 via the first processor chip 16a and via the first memory port 150 to the first main memory 164. The first main memory port 150 is a high-speed interface in at least some embodiments. Thus, the other chips must communicate with and through the first processor chip 16a to access this first main memory 164. Some or all of the other chips in some embodiments have, likewise, their own respective main memory which are shared with the other chips including with the first processor chip 16a. Like with the first main memory 164 being accessible only via the first processor chip 16a, the other main memories must be accessed via and through the respective chip and respective portal that are directly operatively connected to the respective other main memory region. For example, in one embodiment six of eight processor chips on a particular drawer have their own main memory exclusively connected thereto as explained above.

FIG. 2 shows that the first processor chip 16a has access to a restricted-access memory region and/or is operatively connected to the restricted-access memory region. The restricted-access memory region may be referred to as a hardware system area (HSA) which contains some internal code for operating the chip but is not accessible to regular operating software programs that are being executed by the mainframe. Within the restricted-access memory region, a restricted-access cache 140 is present which hosts a first remote access vector 142 and a memory coherence directory 144. A memory control unit 160 is also present in at least some embodiments. The first remote access vector 142 may track when copies of data portions stored in the first main memory 164 are created and sent to chips on another node, e.g., for the multi-drawer structure 10 shown in FIG. 1 are sent to chips of the second drawer 12b, the third drawer 12c, and/or the fourth drawer 12d (or in other embodiments are sent to other chips of the first drawer 12a). For the embodiment shown in FIG. 1 with four total drawers, each of three bits of the multiple bits of the first remote access vector 142 correspond to one of the three other drawers of the multi-drawer architecture 10.

The restricted-access cache 140 which is on the first processor chip 100 stores the respective remote access vectors for the most recently accessed data portions for which copies were retrieved from the first main memory 164. For example, when the restricted-access cache has a cache size limit of ten vectors, the ten remote access vectors for the ten most recently accessed data portions (e.g., data lines) from the first main memory 164 are stored in the restricted-access cache 140 as part of the remote access vector. The remote access vectors for data portions which have not been recently accessed and whose priority position was pushed down from and out of the priority spots that are located in the restricted-access cache 140 are stored in a restricted-access portion 166 of the first main memory 164. Thus, the various remote access vectors representing all of the various data portions of data stored in the first main memory 164 are collectively stored in the restricted-access cache 140 on the processor chip 16a and the restricted-access portion 166 of the first main memory 164 that is not on the first processor chip 16a but is operatively exclusively connected to the first processor chip 16a.

The restricted-access cache 140 in some embodiments stores remote access vectors for prioritized data portions of the data stored in the first main memory 164 while the restricted access region of the first main memory 164 itself stores remote access vectors for non-prioritized data portions of the data stored in the first main memory 164. The prioritized portions in some embodiments refer to the aspect described above of the most recently accessed data portions, e.g., (A) data portions which have been accessed at a first respective time which is more recent than a second respective time at which copies for non-prioritized data portions have been requested, (B) data portions which have been accessed within a time period that is more recent than a threshold time period, or (C) data portions which fit in a data queue of a limited size (e.g., large enough to hold five, ten, or some other number of remote access vectors representing the five, ten, etc. most recently accessed data portions). For the various options, the non-prioritized portions are the rest of the data portions in the respective main memory associated with the processor chip which are not the prioritized portions. For the embodiment with the data queue, each time a data portion is newly accessed its remote access vector takes a highest position within the data queue of the restricted-access cache 140 and bumps the other data portions each downward one spot in the data queue, with the remote access vector in the lowest spot in the data queue being evicted for storage in the restricted access portion of the main memory.

To perform ticket manager duties, the ticket manager (designated processor chip) of a respective drawer will first check with (consult with) the restricted-access cache 140 to see if copies have been remotely retrieved and are live. If the restricted-access cache 140 does not contain a remote access vector for a particular data portion, in response the remote access vector is over indicated to be on. The restricted-access cache 140 will then fetch from the restricted-access portion 166 of the first memory 164, the relevant remote access vector so that this remote access vector for the requested data portion will be in the restricted-access cache 140 for the next inquiry from the ticket manager.

In some embodiments, the remote access vectors include additional other bits which track a type of fetch operation which requested the copies of the one or more the data portions to the external drawer. This fetch operation may be a read-only request or a read and write request. The type of the fetch operation may be indicated by setting one or more respective bits in the remote access vector.

The remote access vector may be modifiable to track assorted sizes of data portions for which copies were made and transmitted to remote nodes. The remote access vector is configured to track lines of data. The data portions may be lines of data, and the first remote access vector may include a respective set of multiple bits per line of data. In this instance of tracking on a line-by-line basis, the remote access vector may be more accurate but need to be larger. The transfer of a copy of a data portion (stored in the main memory) to a remote node may trigger the creation of an entry in the respective remote access vector including at least the setting of the bit that corresponds to the remote node who requested the copy. In other instances, the remote access vector may track larger data portions instead of individual lines. For example, the remote access vector may divide the respective associated main memory region into larger groups of, for example, page sizes of 1 KB (4 lines), 2 KB (8 lines), or 4 KB (16 lines), with each of the various pages containing multiple lines of data. Thus, for this embodiment when a copy of any line within one of these regions is made and transmitted to an external node a new remote access vector set of multiple bits is created for this data region.

When any chip whether from the local chip, the local module, or the local drawer, is seeking data from the respective main memory region, e.g., the first main memory 164, after checking one of their own private caches they may check the caches of other more local chips. If no cache has the sought data portion, the chip may seek the data portion directly from the main memory. To maintain data coherency the chips may also determine if a copy of the data portion has been generated and transmitted to a remote node. The use of the remote access vector allows the copy tracking so that unnecessary snoops to those external remote nodes may be avoided. If a first chip seeks data from a respective main memory region and a copy of that data has never been sent to a remote node, then there will be no indicator or set of multiple bits for this data in the remote access vector and no snoop to the remote node to confirm the presence or non-presence of that data portion there is required. Thus, the usage of a remote access vector such as the first remote access vector 142 may reduce the latency of data requests in response to local node misses, reduce a number of requests that are sent on node-node links and thereby conserve bandwidth on those links, save power by avoiding certain cache vector lookups on non-home nodes, and conserve physical space on a node by reducing the number of state machines required to process off-drawer requests. The checking of the remote access vector may occur simultaneously, e.g., in parallel, with a retrieval from the main memory region, because the retrieval from the main memory region will have a higher latency. The check to the remote access vector may indicate whether retrieval must wait for the remote copy or may proceed by taking the copy from the main memory. The remote access vector may be checked and retrieval from the main memory region may occur if searches within the local caches were unsuccessful to find a copy of the desired data portion.

For the multi-drawer architecture shown in FIG. 1, other chips within the various drawers may include their own respective remote access vector which tracks remote copy usage and transmission for data portions of the main memory region that is directly operatively, e.g., exclusively, connected to that respective chip. Thus, a respective remote access vector per port to a respective main memory region may be implemented within various embodiments.

For example, in at least some embodiments a second main memory region is directly operatively connected to the second processor chip 16b in the first drawer 12a shown in FIG. 1. A second restricted-access memory region is part of the second processor chip. The second restricted-access memory region includes a second remote access vector that is configured to track copies of data portions that are transmitted from the second main memory region and that are sent to one or more external drawers. This second remote access vector may store the vectors from recently accessed data portions while other remote access vectors representing other data portions are stored in a restricted-access portion of the second main memory.

A computer system, according to at least some embodiments, may include multiple processor chips in the first drawer 12a, multiple main memory regions respectively operatively connected to the multiple processor chips via a respective port (e.g., high speed interface), and a respective remote access vector per memory port.

For the restricted-access cache 140 that favors storage of a remote access vector tracking those data portions for which copies have recently been transmitted, more efficient retrieval and data management is achieved by requiring data retrieval from the first main memory 164 less frequently.

For the remote access vectors, additional rules may in some embodiments be enforced regarding granularity of the line tracking and setting of flags based on state of retrieval. For the granularity, a 1K, 2K, or 4K page basis may be established and a periodic scrubbing mechanism may be implemented when the data portion tracking changes the size of memory chunks which would receive a set of multiple bits in the remote access vector. For example, if the remote access vector were tracking on a line-based basis so that each line with a transmitted remote copy being used would receive its own set of multiple bits in the remote access vector and then switched to a page-based basis for tracking so that entries are created in the remote access vector in response to a copy of any line in a particular page being created and transmitted to a remote node, then scrubbing of the set bits in the remote access vector may be carried out. Vice-versa if the remote access vector were tracking on a page-based basis and then switched to a line-based basis for tracking, then scrubbing of the set one or more of the multiple bits in the remote access vector may be carried out.

Flags for pages may be shared and added in the remote access vector to indicate whether the pages were retrieved in a non-modifiable or modifiable-exclusive state across nodes. These flags may help favor local memory sourcing over snooping and remote data hits. The remote access vector may indicate whether a remote node requests a data portion as read-only or in an exclusive state for a write operation. Another attempt to access the data portion by a local chip may check the remote access vector to see whether the remote node asked for and received the copy as read-only or in an exclusive state. If the copy was sent to the remote node as read-only, the local chip does not need to wait for the response from the remote node. If the copy was pulled as an exclusive state, the local chip must wait for the response from the remote node. Indicating the type of usage of the copy by the remote node helps the remote access vector add flexibility for the local chips in knowing what types of communication with the remote node are mandatory and which are avoidable.

While the processor chip of FIG. 2 is used to provide an illustration of computer hardware in which a remote access vector of the present embodiments is implemented, it is understood that the depicted hardware is not limiting and is intended to provide an example of a suitable computer hardware in which the techniques of the present embodiments are applied. It should be appreciated that FIG. 2 does not imply any limitations with regard to the hardware in which different embodiments may be implemented. Many modifications to the depicted hardware may be made based on design and implementation requirements.

In some embodiments, a computer-implemented method includes setting a value in a first remote access vector in response to a copy of a data portion being requested from a first main memory and sent to an external processing node. The first remote access vector is stored in a first restricted-access memory of a first processor chip of a first drawer. The first remote access vector includes multiple bits. A number of the multiple bits is determined based on a number of external processing nodes that can receive a respective copy of the data portion. For example, the remote access vector contains three bits with each of the three bits respectively corresponding to a respective different one of three external processing nodes.

In some embodiments, a computer-implemented method further includes retrieving another set of multiple bits for the first remote access vector in response to a new copy being requested for a first data portion, that until the request occurred, was not prioritized. The retrieving includes receiving a copy of the other set from the main memory and storing the received copy of the other set in the first restricted-access memory of the first processor chip.

FIG. 3 shows a drawer 2000 which can be part of a mainframe computer (see, e.g., FIGS. 1 and 4) and which includes interconnected multiple processor chips according to at least one embodiment. The drawer 2000 includes eight interconnected processor chips labeled as 200, 201, 202, 203, 204, 205, 206, and 207, respectively. The eight chips are divided into four pairs, with a first pair 240 being labeled and includes the processor chips 200 and 201. Each of the eight processor chips has a bus connection with the other seven processor chips of this drawer 2000. These bus connections are illustrated in FIG. 3, with a first bus connection 230 being labeled that connects the processor chip 201 and the processor chip 204. A bus connection is referred to in at least some embodiments as an electronic pathway line. The processor chips communicate with computer memory in the drawer such as first memory 222 and second memory 224. FIG. 3 shows the processor chip 206 connected to the first memory 222 and the processor chip 207 connected to the second memory 224. The other processor chips are connected to other computer memories. The processor chips of this drawer 2000 are fully connected to each other but are not typically fully connected to the processor chips on another drawer and instead are usually connected by a single fork chip and a single or dual bus between the drawer and the other drawer.

Figure 4:
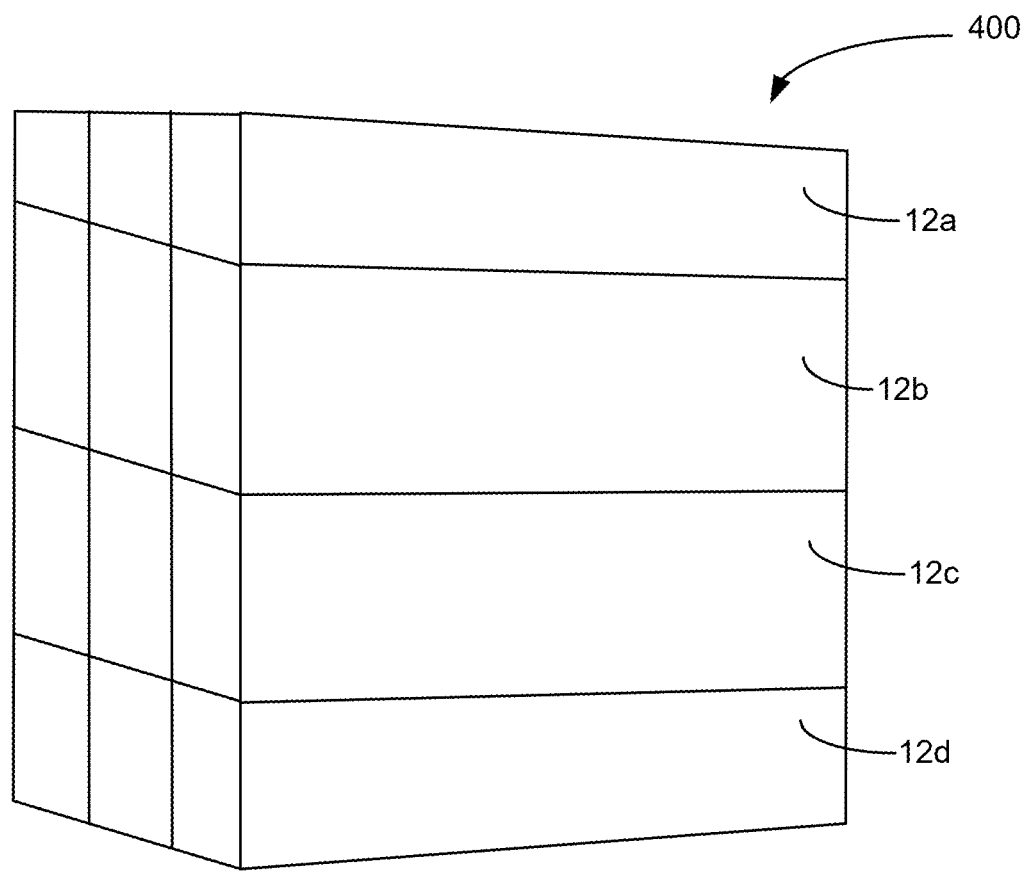
FIG. 4 shows an external perspective view of a mainframe computer according to at least one embodiment which includes the multiple drawer architecture shown in FIG. 1.

FIG. 4 shows an external perspective view 400 of the multi-drawer architecture 10 of FIG. 1 and which is a mainframe computer according to at least one embodiment. A mainframe such as the multi-drawer architecture 10/400 is a large computer used by individuals or organizations for critical applications, bulk data processing, and/or large-scale transaction processing. A mainframe is a type of server, although all servers are not mainframes, and all servers are not created to be equal. The mainframe may help power clouds, build industries, and fuel innovation by enhancing computing power. The mainframe may be implemented as part of a hybrid cloud to preserve privacy of data, achieve cyber resilience, and implement and deploy developed cloud-native capabilities.

The mainframe shown in FIG. 4 includes the multi-drawer structure of FIG. 1 including the first drawer 12a, the second drawer 12b, the third drawer 12c, and the fourth drawer 12d that were shown in FIG. 1. Thus, the mainframe also includes the communication channels between these drawers as was shown in FIG. 1. The chips on these drawers may host a working partition for a computing/processing project. The working partition may be fit into a single drawer or may be spread across multiple drawers. Each chip may include its own set of remote access vectors in order to track the copies of data sent to other drawers.

The computing/processing project may be carried out by a variety of other computing nodes which access software and data stored on the mainframe. For example, various cloud computing nodes which communicate to operate programs using the mainframe may include computing devices used by cloud consumers, such as, for example, a desktop computer, a personal digital assistant (PDA) or cellular telephone, a laptop computer, and/or automobile computer system. These various nodes may communicate with one another and with the mainframe via a communication network. The cloud computing nodes may be grouped (not shown) physically or virtually, in one or more networks, such as Private, Community, Public, or Hybrid clouds as described hereinabove, or a combination thereof. This allows cloud computing environment to offer infrastructure, platforms, and/or software as services for which a cloud consumer does not need to maintain resources on a local computing device. Other types of nodes could also communicate with the mainframe over any type of network and/or network addressable connection (e.g., using a web browser).

In some embodiments, the remote access vector described above is defined as including one or more, e.g., multiple, n-tuple vectors wherein n is greater than one. n corresponds to a number of different remote nodes that are able to request and receive copies of data portions from a main memory which is exclusively accessed by the processor chip hosting the remote access vector. A respective one of values of one of the n-tuple vectors is changed in response to a respective copy being sent to the remote node that corresponds to that one of the values. For the system with four possible external remote nodes which can receive copies of data from the main memory which is exclusively accessed by the processor chip hosting the remote access vector, the n-tuple vector may appear as $[x, y, z, j]$ where each of the four values $(x, y, z, j)$ is a numeric value that can be changed from one value (e.g., one) that indicates the corresponding remote node has a copy of the relevant data portion and can be changed to another value (e.g., zero) that indicates the corresponding remote node does not have a copy of the relevant data portion.

Figure 5:
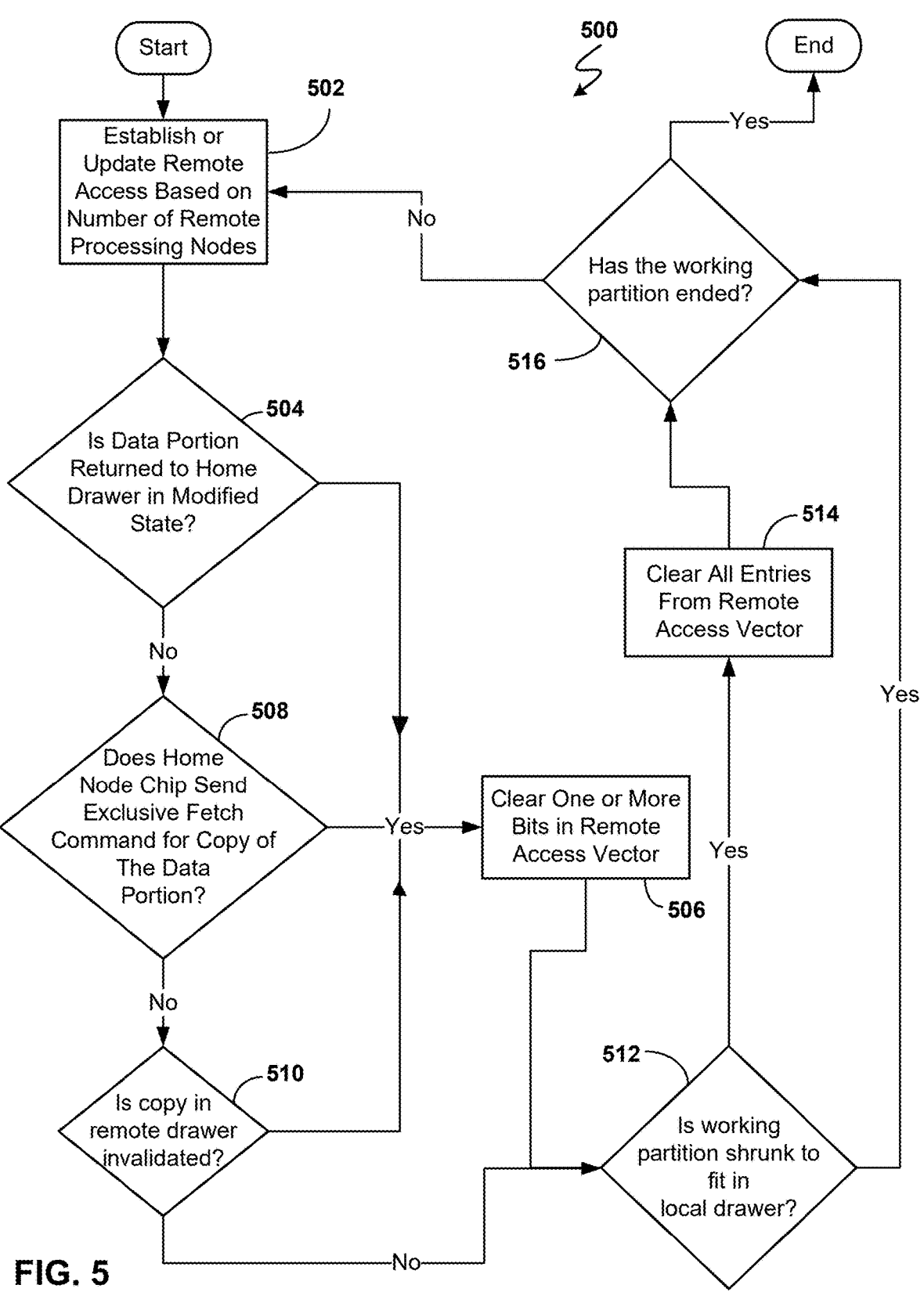
FIG. 5 is an operational flowchart illustrating a remote access vector scrubbing process according to at least one embodiment.

FIG. 5 is an operational flowchart illustrating a remote access vector scrubbing process 500 according to at least one embodiment which is a computer-implemented method. The remote access vector scrubbing process 500 may be implemented to manage various remote access vectors, e.g., the first remote access vector 142 shown in FIG. 2, within a multi-node system. The remote access vector scrubbing process 500 describes various instances how the entire remote access vector or portions thereof may be scrubbed, e.g., updated, cleared, or removed, based on changes in the system to provide a more up-to-date directory that is useful for managing and reducing data transmissions to remote nodes. The scrubbing helps keep the content of the remote access vector accurate over time, which is a challenging task due to data being retrieved and sent back and forth throughout the computer multi-node system.

Figure 6:
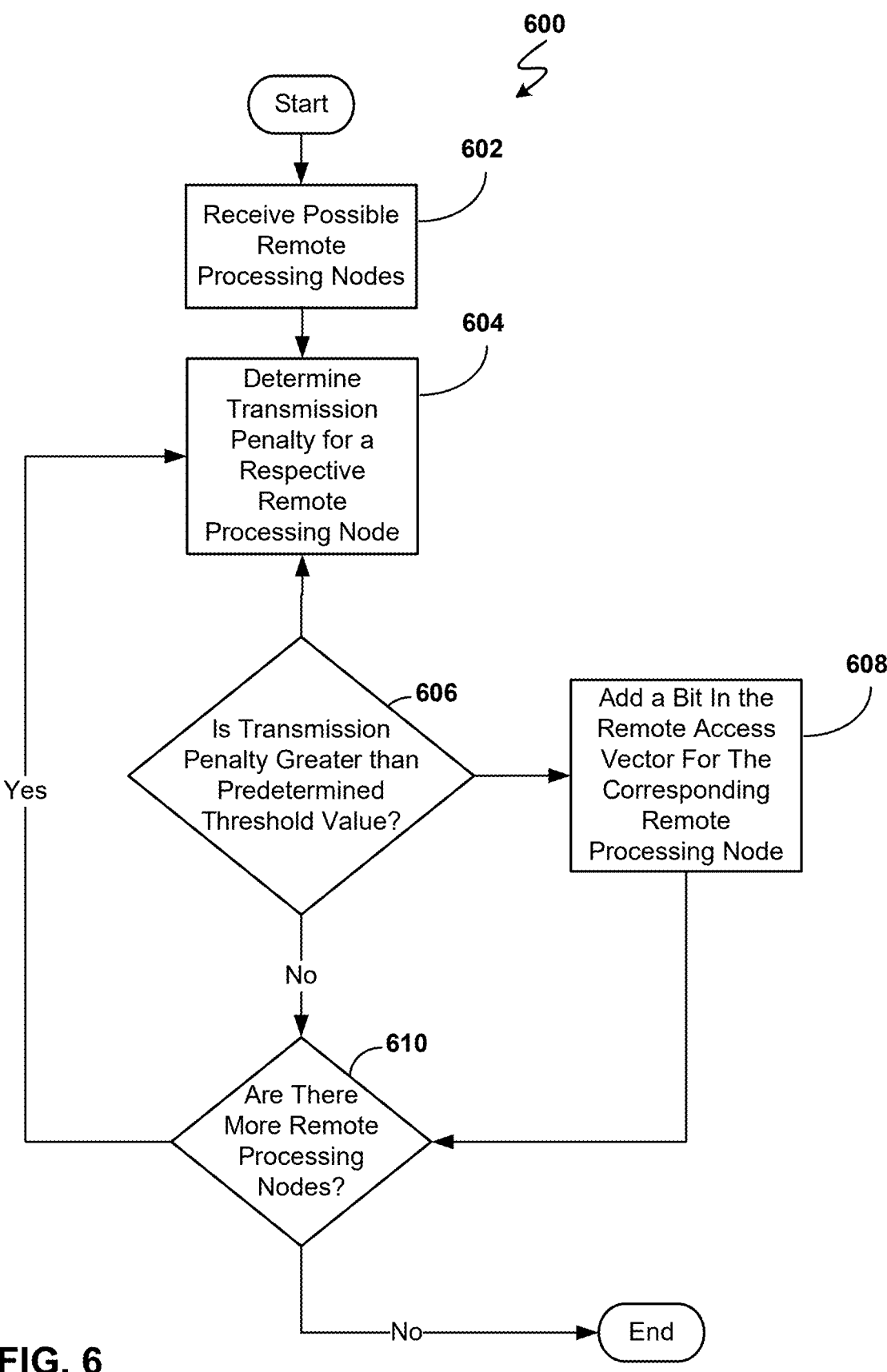
FIG. 6 is an operational flowchart illustrating a process of building a remote access vector with multiple tracking bits according to at least one embodiment.

In step 502 of the remote access vector scrubbing process 500, a remote access vector with one or more sets of multiple bits is established or updated. The first remote access vector 142 in FIG. 2 and described above shows an instance of where the remote access vector for step 502 may be present and established. Table 1 above shows examples of a remote access vector and various meaning of set bits within its multiple bits. Adding or removing one or more sets of multiple bits to the first remote access vector 142 may constitute updating the remote access vector as part of step 502. FIG. 6 which is described below shows one example of establishing a remote access vector.

In step 504 of the remote access vector scrubbing process 500, a determination is made whether a data portion has been returned to a home drawer in a modified state. For example, if a copy of a data portion was sent to a remote node, then a set of multiple bits will have been created for this data portion as part of the remote access vector. If this data portion has been updated at the remote node and then returned to the home node for storage of the updated data in the main memory, then the determination of step 504 is affirmative and the remote access vector scrubbing process 500 may proceed to step 506. If the determination of step 504 is negative and copies of data portions sent to remote nodes have not been returned to the home node in a modified state, then the remote access vector scrubbing process 500 may proceed to step 508.

In step 506 of the remote access vector scrubbing process 500, one or more bits in the remote access vector are cleared. The set bits track the copy of the data portion which in step 504 returned in a modified state to the home drawer. In some instances, the clearing of step 506 may include changing a set bit from "1" to "0". In some instances, the clearing of step 506 may include deleting the associated set bit from the respective remote access vector. Thus, if the remote access vector held N sets of multiple bits, after the clearing of step 506 the remote access vector may hold N−1 sets of multiple bits. In some instances, the clearing of step 506 may include keeping the overall set that corresponds to the data portion whose copy was returned but clearing a state-indicating bit of the multiple bits. Thus, if the remote copy changed its state from an exclusive copy to a non-exclusive copy, the remote access vector may remain alive but particular one or more bits that track the particular state may be updated. Scrubbing when multiple bits are used per entry to track additional information may be more complex yet provide enhanced management of the remote access vector and the snoops/retrievals that are sent to the remote nodes. The remote access vector may allow a snoop in some instances, but the snoop may be sent with a known location identification (ID) of the remote copy, so that snoop can efficiently be directed instead of a searching broadcast having to be sent to all remote nodes.

After completion of step 506, the remote access vector scrubbing process 500 may proceed to step 512 which is subsequently described.

In step 508 of the remote access vector scrubbing process 500, a determination is made whether a home node chip sends an exclusive fetch command for a copy of the data portion. If an exclusive fetch command is sent, then other copies of the data portion that may be present in various caches amongst the chips and one or more drawers of the working partition may need to be invalidated and/or evicted from the corresponding external node to which they were sent. This data portion referred to in step 508 is a data portion of which a copy has been requested by a remote node and has been transmitted to the remote node and for which a set of bits in step 502 has been created as part of the remote access vector to track that data copy. The exclusive fetch may indicate an intention to modify the data copy. If the modification is carried out, that would mean that copies of that data portion held in other caches and/or in the remote node would be out-of-date. The processor core issuing the exclusive fetch command may thereby become an exclusive temporary "owner" of that data portion with respect to modification purposes. To maintain coherency, those other copies need to be invalidated and/or evicted. Pulling this copy to the home drawer in response to the exclusive fetch command is an example of the data being pulled in an exclusive state to the home node.

An invalidation/eviction broadcast to the other nodes/caches may also be received by the remote access vector. Receipt of this message lets the remote access vector know that one or more sets of multiple bits related to this data portion will need to be scrubbed. If the local processor that issues the intention already has a copy of the data portion, then that local processor needs to invalidate the other copies but not retrieve any new copy. If the local processor that issues the intention does not already have a copy of the data portion, then that local processor needs to retrieve the most recent version of the data portion as well as invalidate the other copies. This retrieval may include retrieving a copy from a remote node. Thus, in this instance the exclusive fetch operation may retrieve the data portion copy back from the remote node. This retrieval may include the remote node not keeping a copy, so the remote access vector would not need to indicate that the remote node has a copy. Thus, the set of bits, e.g., an individual bit of that sets of bits, for that data portion may need to be scrubbed in the remote access vector.

If the determination of step 508 is affirmative and a home node chip has sent an exclusive fetch command for the data portion, then the remote access vector scrubbing process 500 may proceed to step 506. Step 506 was described above and may be performed after step 508 in addition to or alternatively to being performed directly after step 504. If the determination of step 508 is negative and no exclusive fetch command has been generated and sent for the data portion, then the remote access vector scrubbing process 500 may proceed to step 510.

In step 510 of the remote access vector scrubbing process 500, a determination is made whether a copy in the remote drawer is invalidated. This copy of step 510 refers to a copy which was sent to a remote node and for which a set of multiple bits in the remote access vector of step 502 has been created to track same. This copy may have been sent in an exclusive state to the remote node. The invalidation and/or instruction to cause the invalidation may reach the remote access vector so that the remote access vector may be scrubbed for this set of multiple bits. In some embodiments, to make an affirmative determination for step 510 it may also be required that the remote copy have been in an exclusive state along with requiring that the remote access vector receive notification of the eviction/invalidation of that remote copy. This eviction may in some instances be referred to as a line replacement unit (LRU) cast-out. Thus, this step includes in some embodiments respectively scrubbing one or more of the set bits of the remote access vector in response to the corresponding remote processing node evicting the respective transmitted copy.

If the determination of step 510 is affirmative and a copy in the remote drawer has been invalidated, then the remote access vector scrubbing process 500 may proceed to step 506. Step 506 was described above and may be performed after step 510 in addition to or alternatively to being performed directly after steps 504 and/or 506. If the determination of step 510 is negative and no copy in the remote drawer has been invalidated which may mean that the bits in the remote access vector are current, then the remote access vector scrubbing process 500 may proceed to step 512.

In step 512 of the remote access vector scrubbing process 500, a determination is made whether the working partition is shrunk to fit in the local drawer. The remote access vector that was established or updated in step 502 belongs to this working partition that is evaluated in step 512. For example, if the working partition initially extends across multiple drawers such as the first drawer 12a and the second drawer 12b and then is shrunk to fit exclusively in the first drawer 12a, the bits corresponding to the second drawer 12b are not needed in the remote access vector. The remote access vector serves to help manage snooping to remote nodes and to reduce snooping to remote nodes. If no remote node is part of the working partition, then the previous entries/vectors are not needed. If the determination of step 512 is affirmative and the working partition has been shrunk to fit in the local drawer so that none of the chips working with the main memory has a transmission penalty that exceeds a threshold value, then the remote access vector scrubbing process 500 may proceed to step 514. If the determination of step 514 is negative and the working partition has not been shrunk to fit within the local drawer, then the remote access vector scrubbing process 500 may proceed to step 516.

In some embodiments, a dynamic memory relocation (DMR) may be implemented to shrink a working partition from multiple drawers to a single drawer. Thus, for this embodiment the step of 512 may include the receiving of a dynamic memory relocation signal. The reception of this dynamic memory relocation signal at the respective processor may trigger the scrubbing of all of the sets of bits in the first remote access vector 142 and in the remote access vectors stored in the restricted-access portion 166 of the main memory 164.

In step 514 of the remote access vector scrubbing process 500, all entries are cleared from the remote access vector. This remote access vector is the one that was established and/or updated in step 502. In some instances, the clearing of step 514 may include changing a respective set bit from "1" to "0" for each of the multiple bits that are set. In some instances, the clearing of step 514 may include deleting all entries from the respective remote access vector. Thus, if the remote access vector held N entries, after the clearing of step 514 the remote access vector may hold zero entries. The remote access vector would then be ready and in a clean state to accept new entries or sets of multiple bits if the working partition is thereafter changed again to extend across multiple drawers.

In step 516 of the remote access vector scrubbing process 500, a determination is made as to whether the working partition has ended. The remote access vector that was established or updated in step 502 belongs to this working partition that is evaluated in step 516. If a computing/processing project has ended so that the workload partition is no longer needed, then the working partition may conclude. With the working partition no longer operating, the remote access vector is no longer needed and managing and updating the remote access vector no longer needs to be carried out. If the determination of step 516 is affirmative and the working partition has ended, then the remote access vector scrubbing process 500 may end. If the determination of step 516 is negative and the working partition has not ended, then the remote access vector scrubbing process 500 may proceed to step 502 for a repeat of one or more of steps 502, 504, 506, 508, 510, 512, and 514. Thus, the remote access vector scrubbing process 500 may continue for the life of a working partition.

In some instances, a memory clear operation to the main memory region may trigger invalidating the data copies in all caches that were copies of the written-over region in the main memory. A memory clear operation may write directly to memory which causes the cache copies to be outdated. In this instance, all remote access vector entries corresponding to the written-over region may be cleared because they are no longer up to date. The remote access vector may receive a memory clear signal and address of a written-over line, so that the remote access vector may in response clear the remote access vector bits for that line. A similar clearing of the remote access vector or an entry in the remote access vector occurs for a direct memory access (DMA) which writes directly to memory.

Although the remote access vector scrubbing process 500 of FIG. 5 is described as occurring with terminology of "a" remote access vector, in at least some embodiments the remote access vector scrubbing process 500 may be performed with multiple remote access vectors, e.g., with two remote access vectors, with multiple sets of remote access vectors, or with a remote access vector per memory port for the main memory for the working partition.

The remote access vector and management thereof described herein may be implemented in memory structures in which the home node and non-home node have comparable cache sizes and non-inclusive caches. The remote access vector and management thereof may be implemented if the number of remote nodes in the system scales and increases to a number greater than 1. The present embodiments minimize broadcast across different nodes by tracking the states of lines pulled by a remote node. The present embodiments avoid inevitable broadcast across different nodes and reduce the frequency of such node-to-node transmissions. The triggers for scrubbing the remote access vector may come from messages sent from the remote node to the local chip that hosts the respective remote access vector. The triggers for scrubbing the remote access vector may additionally and/or alternatively come from messages sent to the local chip from somewhere else on the local drawer.

It may be appreciated that FIG. 5 provides only illustrations of certain embodiments and does not imply any limitations with regard to how different embodiments may be implemented. Many modifications to the depicted embodiment(s) such as to an order of the steps performed may be made based on design and implementation requirements.

FIG. 6 is an operational flowchart illustrating a process 600 of building a remote access vector with multiple tracking bits according to at least one embodiment which is a computer-implemented method. In a first step 602, indicators of possible remote processing nodes are received. For example, the various remote processing nodes could be multiple drawers in a multi-drawer architecture, multiple processing chips in a single drawer, or multiple mainframes connected via an internet connection. In a second step 604, a transmission penalty is determined for a respective remote processing node as it relates to a single home memory-connected node. A data transmission is sent to the respective remote processing node to determine a transmission time and/or a wait time for accessing shared transmission resources such as a shared transmission line. The time or those times analyzed as a group are considered the transmission penalty or are weighted to determine the transmission penalty. In step 606, a determination is made whether the transmission penalty is greater than a predetermined threshold value. This determination is made by an automated comparator of a computer. The predetermined threshold value is received and is based on prior tests of whether snoop governing is worth the extra data storage requirements needed to implement the remote access vectors. In some embodiments, the predetermined threshold value is determined via machine learning output for a machine learning model that analyzes prior distributed computing arrangements and success of prior usage of remote access vectors. If step 606 is affirmative, thereafter step 608 is performed by adding a bit in the remote access vector with the bit representing the corresponding remote processing node. If step 606 is negative, thereafter step 610 is performed and a determination is made as to whether there are more remote processing nodes to analyze. Step 610 is also performed after step 608 in the process 600. If step 610 is affirmative, then the process 600 returns to step 604 to repeat steps 604 and 606 or 608 with respect to the other remote processing node. If step 610 is negative, then process 600 is completed and the number of bits needed for each set of multiple bits of the remote access vector is known for using this remote access vector of the relevant computing environment/embodiment to govern and enhance remote data snooping.

The flowchart and block diagrams in the Figures illustrate the architecture, functionality, and operation of possible implementations of systems and methods according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A first processor chip comprising:
one or more processor cores;
one or more cache memories; and
a restricted-access memory storing a remote access vector configured to track copies of data portions that are stored in a main memory, the remote access vector comprising multiple bits, wherein each bit of the multiple bits corresponds respectively to one of different remote processing nodes that are able to request and receive one or more of the copies of the data portions and are external to the first processor chip, wherein the bits are respectively set when a respective copy of a particular data portion is transmitted to the corresponding remote processing node.

2. The processor chip of claim 1, wherein one or more of the set bits of the remote access vector are respectively scrubbed in response to the corresponding remote processing node evicting the respective transmitted copy.

3. The processor chip of claim 1, wherein in response to a copy of a first data portion being fetched exclusively by a first remote processing node, the remote access vector is updated to scrub one or more set bits of the multiple bits and to set a first bit of the multiple bits, the first bit corresponding to the first remote processing node.

4. The processor chip of claim 1, wherein the remote access vector further tracks a type of fetch operation which requested a respective copy of one or more of the data portions to the respective remote processing node, wherein the tracking of the type comprises setting one or more additional bits in the remote access vector.

5. The processor chip of claim 1, wherein the data portions are lines of data, and the first remote access vector includes a respective set of multiple bits per line of data, with a number of the bits in each of the sets corresponding to the number of the remote processing nodes.

6. A computer system comprising:
a first drawer;
the first processor chip of claim 1, wherein the first processor chip is disposed in the first drawer;
the main memory, wherein the main memory is operatively connected to the first processor chip, wherein sets of multiple bits of the remote access vector for non-prioritized data portions are stored in the main memory; and
one or more electronic pathway lines connected to the first processor chip.

7. The computer system of claim 6, wherein the restricted-access memory of the first processor chip is a cache memory that stores sets of multiple bits of the remote access vector for prioritized data portions.

8. The computer system of claim 7, wherein the sets of multiple bits stored in the main memory are stored in a restricted-access region of the main memory.

9. The computer system of claim 7, wherein the prioritized data portions comprise data portions for which copies have been accessed at a first respective time which is more recent than a second respective time at which copies for the non-prioritized data portions have been requested.

10. The computer system of claim 7, wherein the prioritized data portions comprise data portions for which copies have been accessed within a time period that is more recent than a threshold time period, and the non-prioritized data portions comprise data portions for which copies have been accessed in a time period that is less recent than a threshold time period.

11. The computer system of claim 7, further comprising logic that fetches one or more of the sets of multiple bits of the remote access vector from the main memory to store in the restricted-access memory in the first processor chip in response to a determination that the one or more sets are missing from the restricted-access memory.

12. The computer system of claim 7, wherein the one or more electronic pathway lines lead to one or more of the different remote processing nodes.

13. The computer system of claim 7, further comprising programming logic that causes a search for a highest point of coherency of a data portion stored in the main memory to be performed, the search comprising:
consulting the remote access vector to determine that one or more set bits of the remote access vector indicates that one or more copies of the data portion have been retrieved and transmitted to the remote processing node; and
obtaining, for the search, remote node controller resources for only those one or more remote processing nodes that correspond to the one or more set bits.

14. The computer system of claim 13, wherein the remote node controller resources are controlled by a processor chip acting as a ticket manager of the first drawer for off-drawer copy tracking.

15. The computer system of claim 7, wherein a first remote processing node of the different remote processing nodes is disposed on a second drawer.

16. The computer system of claim 7, wherein the first processor chip incurs a respective transmission penalty for data retrieval from the remote processing nodes, and
wherein the corresponding remote processing nodes are selected to correspond to the multiple bits of the remote access vector based on a determination that the respective transmission penalty to the corresponding remote processing node is greater than a predetermined threshold.

17. The computer system of claim 7, wherein the first remote processing node is a remote processor chip of the first drawer.

18. A computer-implemented method comprising:

setting a value in a first remote access vector in response to a copy of a data portion being requested from a first main memory and sent to an external processing node, the first remote access vector being stored in a first restricted-access memory of a first processor chip of a first drawer, wherein the first remote access vector includes multiple bits, wherein a number of the multiple bits is determined based on a number of external processing nodes that can receive a respective copy of the data portion.

19. The computer-implemented method of claim 18, further comprising retrieving another set of multiple bits for the first remote access vector in response to a new copy being requested for a first data portion, that until the request occurred, was not prioritized, wherein the retrieving includes receiving a copy of the other set from the main memory and storing the received copy of the other set in the first restricted-access memory of the first processor chip.

20. A processor chip comprising:

one or more processor cores;

one or more cache memories; and a restricted-access memory region, wherein a remote access vector is stored in the restricted-access memory region and is configured to track copies created and sent to an external node while data portions from which the copies were made are stored in a main memory for which the processor chip provides exclusive connective access, the remote access vector comprising multiple n-tuple vectors wherein n is greater than one, and n corresponds to a number of different remote nodes that are able to request and receive the copies, wherein a respective one of values of one of the n-tuple vectors is changed in response to a respective copy being sent to the remote node that corresponds to that one of the values.

\* \* \* \* \*